No. 614,338. Patented Nov. 15, 1898.
H. D. PERKY.
MACHINE FOR REDUCING CEREAL FOOD PRODUCTS TO FORM FOR USE.
(Application filed May 21, 1896.)
(No Model.) 2 Sheets—Sheet 1.
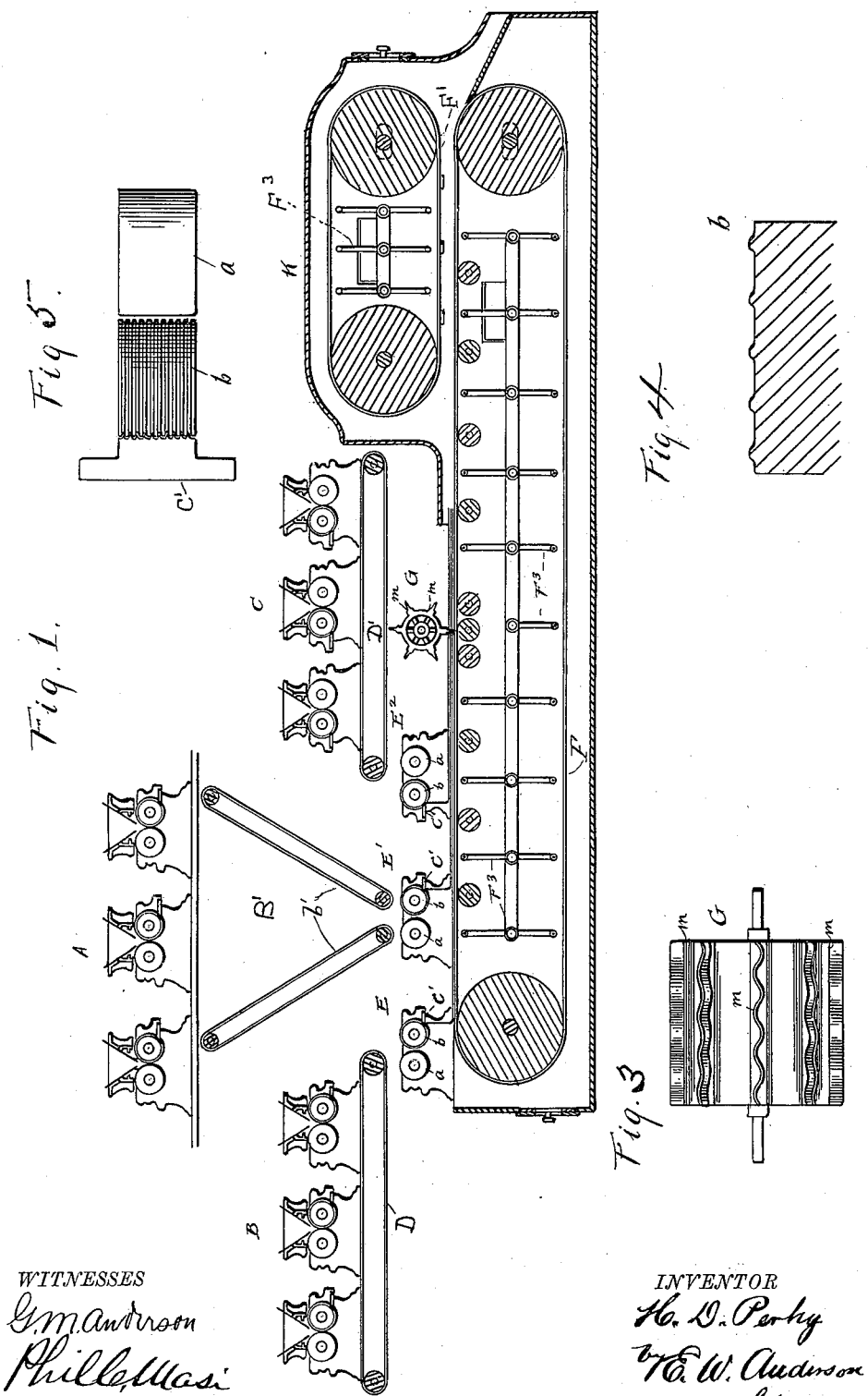
WITNESSES
INVENTOR No. 614,338. Patented Nov. 15, 1898.
H. D. PERKY.
MACHINE FOR REDUCING CEREAL FOOD PRODUCTS TO FORM FOR USE.
(Application filed May 21, 1896.)
(No Model.) 2 Sheets—Sheet 2.
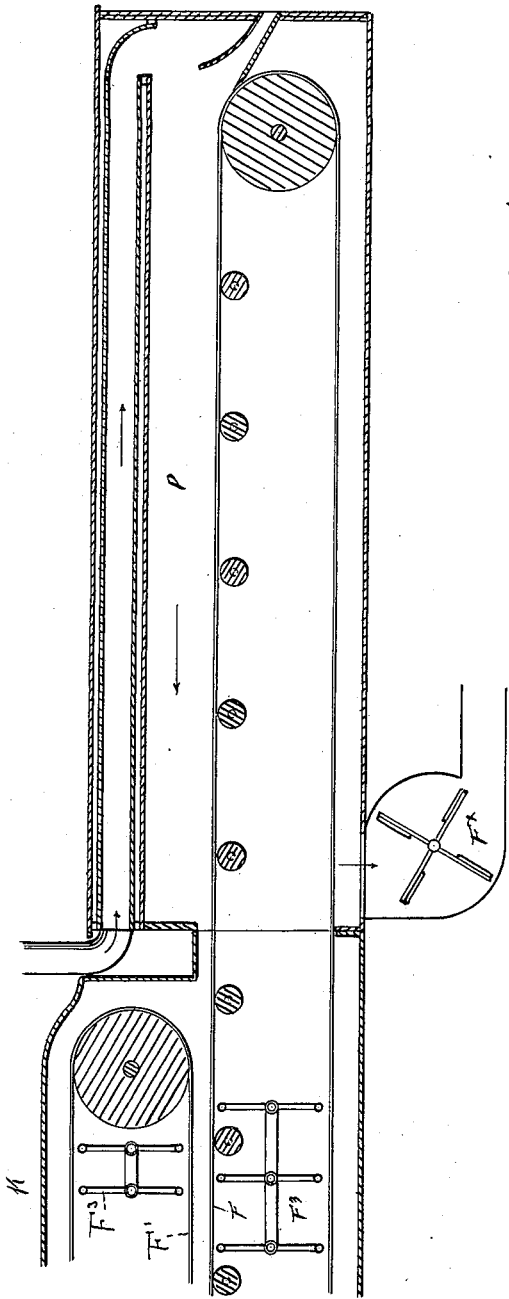
WITNESSES
G. M. Anderson
Phil C. Masi.
INVENTOR
H. D. Perky
by E. W. Anderson
his Attorney

UNITED STATES PATENT OFFICE.

HENRY D. PERKY, OF WORCESTER, MASSACHUSETTS.

MACHINE FOR REDUCING CEREAL FOOD PRODUCTS TO FORM FOR USE.

SPECIFICATION forming part of Letters Patent No. 614,338, dated November 15, 1898.

Application filed May 21, 1896. Serial No. 592,493. (No model.)

*To all whom it may concern:*

Be it known that I, HENRY D. PERKY, a citizen of the United States, and a resident of Worcester, in the county of Worcester and State of Massachusetts, have invented certain new and useful Improvements in Machines for Reducing Cereal Food Products to Form for Use; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a central longitudinal section through the devices constituting the invention, being partly diagrammatic. Fig. 2 is a sectional view showing the evaporating-chamber in connection with the oven by a continuous belt. Fig. 3 is a detail view of the cutter or indenter. Fig. 4 is a sectional view illustrating the projections upon the roller $b$. Fig. 5 is a plan view of the rolls $a$ and $b$ and the scraper. Fig. 6 is a perspective view of the wafer.

The object of this invention is to provide means whereby grain, and especially wheat in its entire or berry form, having been properly cleaned and cooked, is reduced to the form of a band or ribbon in which the interior and exterior portions of the grain or berry are intimately commingled, such band or ribbon being separated or indented transversely to provide sections of suitable size and shape for baking into crackers or wafers. It is also designed to provide means whereby such bands or ribbons of the grain product may be overlaid or plicated and transversely separated or indented in such a manner as to provide sections of suitable size for baking, each section consisting of several thicknesses or layers duly connected at the edges of the section. It is also designed to provide means for baking these sections continuously as they are formed, and, finally, it is designed to provide means for ornamenting the sections superficially by raised or indented configurations in order to give them an attractive appearance.

In the accompanying drawings I have indicated at A, B, and C several sets or gangs of shredding devices, substantially of the character described in detail in Letters Patent No. 502,378, dated August 1, 1893, into the hopper of which the grain in its entire or berry form is fed after it has been properly cleaned and properly cooked, preferably in the manner substantially as set forth in Letters Patent No. 548,086, dated October 15, 1895. The number of shredding-heads in each set or gang is determined by the thickness of the ribbon or band desired and by the rapidity of production contemplated. These roll-shredders discharge the material in the form of threads or shreds, in which the exterior coats and the gluten layers of the grain are intimately commingled with the interior starch. The threads or shreds are transferred by means of a hopper guide or carrier to the hopper of the band-rollers E E' $E^2$, there being one band-roller to each set or gang of reducing-rollers.

The band-roller consists of a pair of rolls $a$ and $b$ and a discharger or cleaner C', being similar to the shredding or reducing head in its main features of construction, the rolls, however, not being in contact, as the reducing-rolls are, but being separated from each other a distance corresponding to the thickness of the band desired. The front roll $a$ may have a plain cylindrical surface or it may be circumferentially grooved. The back roll $b$ may be plain or it may have shallow grooves or indentations or slight projections of ornamental design, such projections or indentations having beveled walls or rounded angles to provide for the ready detachment of the band as it passes from the rolls to the carrier F.

In the arrangement shown in Fig. 1 the three reducing-machines (designated by B) are arranged to discharge upon an endless carrier D, which transfers the product to the hopper of the first band-roller E. The second set of reducing-machines (marked A) discharge into a hopper B', whose lateral walls may, as shown, consist of endless traveling bands $b'$. This hopper discharges the material to an intermediate band-roller E'. The third set of reducing-machines (marked C) discharge onto an endless carrier D', which delivers the product to the third band-roller $E^2$.

One band-roller, with its set or gang of reducing-heads, will provide a single band upon the carrier F, where by means of a cutter or indenter G it may be separated or indented in a sectional manner to form crackers or wafers. The carrier F is preferably a traveling band of steel adapted to transport the separated or indented band through the oven K, which is preferably heated by gas, as indicated at F³, which designates gas-burners. F' designates an upper baking-band, heated by similar burners. In passage through this oven the wafers are baked, and they are discharged at the end of the carrier in crisp condition. This carrier may also extend beyond the oven into an evaporating-chamber, as indicated at P, or it may discharge its contents upon a carrier which moves more slowly through such evaporating-chamber. Said chamber is preferably provided with an exhaust-fan F×.

The cutter or indenter G may be of rotating character, as indicated, its blades being rectilinear or curved or of wave-like or other shape in accordance with the design of the cracker or wafer desired to be produced. The cutter is geared to run at the same rate of speed as the carrier.

When it is desired to form a wafer of two or more layers or thicknesses, two or more band-rollers, with their respective sets or gangs of reducing-heads, are employed, the arrangement being in succession, or so that the band produced by the second band-roller will overlie that produced by the first band-roller and will be overlaid by that produced by the third band-roller. In order to insure the connection of edges of the section of a band of several layers, it is designed to provide the cutter or indenter with pressing-shoulders, as indicated at m. In this manner it is designed to provide wafers of several layers or folds each of which is entire or of plicated character when finished in baking. While the means described are designed for the production of these crackers or wafers in large quantities suitable for commercial supply, manipulation of the material is avoided, so that consumers are protected, in an important manner, from a sanitary point of view.

In making a wafer of two or more layers or thicknesses two or more band-rollers may be employed in series, the first band-roller having its grooved roll and scraper or comb in the rear of the plain roll and the last band-roller having its grooved roll and scraper in front of its plain roll, as indicated in Fig. 1. The ribbon of material falling from the first roller upon the receiving-carrier will have an under surface of finely ribbed or corrugated configuration, the size of the ribs or corrugations depending upon that of the grooves of the roll, which may be as small or as fine as those of a grooved reducing-roll. This ribbon of material will form the under layer. The upper layer of material, which is formed by the last band-roller, will have its upper surface of similar ribbed or corrugated character. Intermediate band-rollers may be employed to provide intermediate layers where the wafer is to consist of more than two layers. In any case, however, when the mechanism is arranged, as indicated, with the first and the last band-rollers in reversed position the upper and under surfaces of the wafer will present an ornamental surface of fine ribs or corrugations, and when the bands of material are rolled thin by means of finely-grooved rolls referred to such rolls will have a comminuting or shredding effect such as will reduce the cooked wheat when fed directly into the hopper of the band-rollers, so that the prior action of reducing-rolls is not always required.

The reducing-heads used in combination with the band-rollers are designed to provide for a more intimate and thorough commingling of the exterior layers with the interior portion of the grain or berry, and they serve an important purpose in that regard.

Having thus described my invention, what I claim as new, and desire to secure by Letters Patent, is—

The combination with one or more band-rolling machines, and an endless traveling carrier upon which said machine or machines discharge their product, of a rotary indenter or cutter above said band, and having a series of blades provided with pressing-shoulders, substantially as specified.

In testimony whereof I affix my signature in presence of two witnesses.

HENRY D. PERKY.

Witnesses:
SAML. N. ROGERS,
JOHN S. PERKY.